US008889277B2

(12) United States Patent
Lakamraju et al.

(10) Patent No.: US 8,889,277 B2
(45) Date of Patent: Nov. 18, 2014

(54) BATTERY FIRE PREVENTION VIA THERMAL MANAGEMENT

(75) Inventors: Vijaya Ramaraju Lakamraju, Longmeadow, MA (US); Jean Yamanis, South Glastonbury, CT (US); Ulf J. Jonsson, South Windsor, CT (US); Ritesh Khire, East Hartford, CT (US); John M. Milton-Benoit, West Suffield, CT (US); Jinliang Wang, Ellington, CT (US)

(73) Assignee: UTC Fire & Security Corporation, Farmington, CT (US)

( * ) Notice: Subject to any disclaimer, the term of this patent is extended or adjusted under 35 U.S.C. 154(b) by 104 days.

(21) Appl. No.: 13/322,646

(22) PCT Filed: Jun. 8, 2009

(86) PCT No.: PCT/US2009/046621

§ 371 (c)(1), (2), (4) Date: Nov. 28, 2011

(87) PCT Pub. No.: WO2010/144078

PCT Pub. Date: Dec. 16, 2010

(65) Prior Publication Data

US 2012/0079859 A1 Apr. 5, 2012

(51) Int. Cl.

*H01M 10/52* (2006.01)
*E05B 17/00* (2006.01)
*G07C 9/00* (2006.01)
*E05B 47/00* (2006.01)

(52) U.S. Cl.

CPC ..... *E05B 17/0075* (2013.01); *E05B 2047/0058* (2013.01); *G07C 9/00174* (2013.01)
USPC ..... 429/62; 307/10.2; 70/277

(58) Field of Classification Search

None
See application file for complete search history.

(56) References Cited

U.S. PATENT DOCUMENTS

| | | | | |
|---|---|---|---|---|
| 4,329,405 | A * | 5/1982 | Zupancic | 429/56 |
| 5,083,122 | A * | 1/1992 | Clark | 340/5.22 |
| 5,450,065 | A | 9/1995 | Greenfield | |
| 6,588,532 | B1 * | 7/2003 | Adams et al. | 180/271 |

(Continued)

FOREIGN PATENT DOCUMENTS

| | | | |
|---|---|---|---|
| AU | WO2008/003137 | * | 1/2008 |
| CN | 2554287 Y | | 6/2003 |

(Continued)

OTHER PUBLICATIONS

The Feb. 22, 2010 International Search Report for the International Application No. PCT/US2009/046621.

(Continued)

*Primary Examiner* — Ula C Ruddock
*Assistant Examiner* — Lisa S Park Gehrke
(74) *Attorney, Agent, or Firm* — Cantor Colburn LLP

(57) ABSTRACT

An assembly for preventing a fire resulting from the outgassing of a lithium battery in an electronic door lock includes a lithium battery, a circuit board, and a thermal insulation. The lithium battery and circuit board are housed within the electronic door lock. The thermal insulation is arranged between a door interfacing side of the electronic door lock and either or both of the circuit board and lithium battery. Another thermal management technique for preventing fire resulting from the outgassing of a lithium battery in an electronic door lock is achieved by using a battery cover that is selectively movable away from the circuit board or ignition source in response to temperature rise to ensure the lithium battery does not reach a critical temperature that may cause outgassing in close proximity to the ignition source.

6 Claims, 4 Drawing Sheets

(56) References Cited

U.S. PATENT DOCUMENTS

| | | | | |
|---|---|---|---|---|
| 2003/0027036 | A1* | 2/2003 | Emori et al. | 429/61 |
| 2004/0012370 | A1* | 1/2004 | Miller | 320/112 |
| 2005/0086983 | A1 | 4/2005 | Stevens et al. | |
| 2005/0170238 | A1 | 8/2005 | Abu-Isa et al. | |
| 2006/0028068 | A1* | 2/2006 | Koutsandreas et al. | 307/10.2 |

FOREIGN PATENT DOCUMENTS

| | | |
|---|---|---|
| JP | 09082293 A | 3/1997 |
| KR | 20080092064 A | 10/2008 |

OTHER PUBLICATIONS

Author Unknown, "Extended European Search Report," dated Sep. 19, 2012, in corresponding European Patent Application No. 09843426.9, pp. 1-4, published by the European Patent Office.

Extended European Search Report, Supplementary European Search Report, and European Search Opinion for International Application No. PCT/US2009046621, 9 pages.

* cited by examiner

BATTERY FIRE PREVENTION VIA THERMAL MANAGEMENT

BACKGROUND

The present invention relates to door locks, and more particularly to an assembly and method for preventing a battery fire originating in an electronic door lock.

Electronic door locks, as opposed to pure mechanical locks, need a power source to operate the locking and control mechanism. In battery operated electronic door locks, power is obtained from a set of batteries installed in the lock. The most commonly used batteries in electronic door locks are alkaline batteries. The service life (the time after which the batteries need to be replaced) depends on the usage of the lock, but is typically two to three years for normal usage doors. More recently, attempts have been made to increase battery life by incorporating other types of battery technology including lithium battery technology. However, practical application of lithium battery technology in electronic door locks has failed due in part to the technology's adverse affect on the integrity and specifications of fire rated doors. Lithium batteries adversely affect the integrity and specifications of fire rated doors because the batteries can experience severe outgassing of flammable gases and violently deflagrate when exposed to elevated temperatures achievable during a building fire. The violent deflagration of lithium batteries has the undesirable effect that it can cause the fire on one side of the fire rated door to propagate to the other side and hence compromise the intended function of a fire door. A circuit board commonly utilized in electronic door locks is commonly one of the first components to catch fire and act as a potential ignition source for constituents outgassed from the venting of lithium batteries.

SUMMARY

An assembly for preventing a fire resulting from the outgassing of a lithium battery in an electronic door lock includes a lithium battery, a circuit board, and a thermal insulation. The lithium battery and circuit board are housed within the electronic door lock. The thermal insulation is arranged between a door interfacing side of the electronic door lock and either or both of the circuit board and lithium battery.

Another thermal management technique for preventing fire resulting from the outgassing of a lithium battery in an electronic door lock is achieved by using a battery cover that is selectively movable away from the circuit board or ignition source in response to temperature rise to ensure the lithium battery does not reach a critical temperature that may cause outgassing in close proximity to the ignition source.

DETAILED DESCRIPTION

Figure 1:
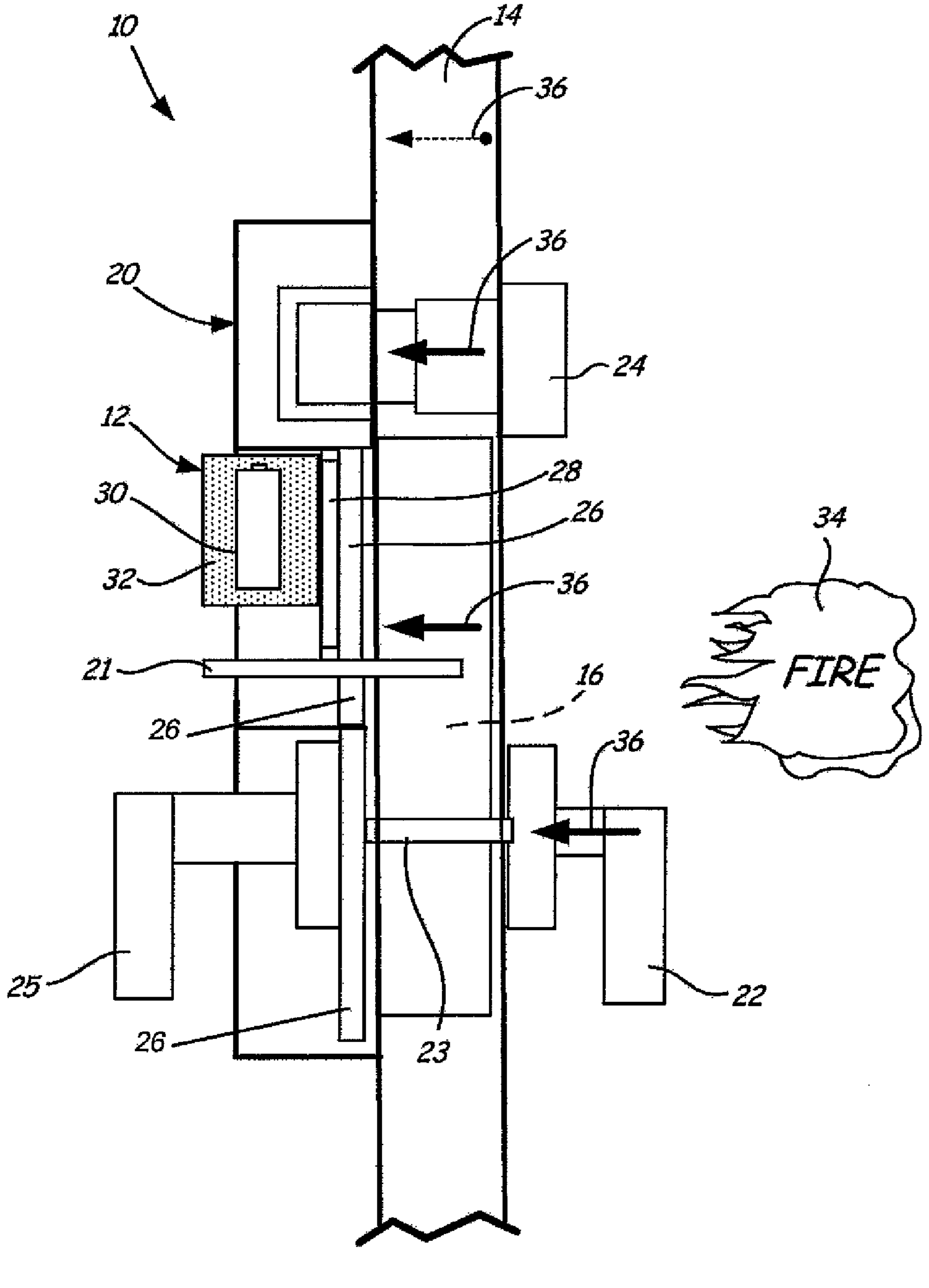
FIG. 1 is a schematic view of an electronic door lock including a lithium battery and a circuit board.

FIG. 1 is a schematic view of one of many designs for an electronic door lock 10 including a printed circuit board 12. The door lock 10 is disposed in a door 14. The door lock 10 includes a mortise 16, an inner escutcheon or lock cover 20, a shaft block 21 for the deadbolt, an outer handle or knob 22, shaft 23, a reader 24, an inner handle or knob 25, a plate 26, a circuit board cover 28, a lithium battery 30, and thermal insulation 32. The electronic door lock 10 extends through the door 14 between an interior side and an exterior side thereof. In the embodiment shown, the printed circuit board 12 is disposed on the interior side of the electronic door lock 10 adjacent the door 14. The door 14 can be part of a vehicle or part of a residential/commercial/hospitality structure. Although the electronic door lock 10 extends from the door 14, portions of the lock 10, for example shaft block 21, can be partially housed within the mortise 16 in the door 14. The electronic door lock 10 has portions external to the door 14 including the inner lock cover 20.

The shaft block 21 movably extends from the mortise 16 into and through the inner lock cover 20. The outer handle 22 connects to the shaft 23 which rotatably extends through the door to connect to the inner handle 25. The reader 24 projects from the outer side of the door 14 and is adapted to receive a coded medium such as a magnetic card, proximity card, or memory key. The inner lock cover 20 houses portions of the inner handle or knob 25, the plate 26, and the printed circuit board 12.

The plate 26 and printed circuit board 12 extend along the exterior of the door 14 beneath the inner lock cover 20. Side surfaces (not shown) of the inner lock cover 20 abut the interior interfacing surface of the door 14 to form an enclosed unit.

The inner lock cover 20 interconnects with the printed circuit board cover 28 adjacent the printed circuit board 12. In one embodiment, the printed circuit board cover 28 is removable or movable to expose the printed circuit board 12 to ambient air external to the door lock 10. The thermal insulation 32 is disposed adjacent the shaft block 21 and abuts both the plate 26 and the printed circuit board 12. The battery 30 is disposed adjacent printed circuit board 12 within the enclosed unit formed by the inner lock cover 20 or the printed circuit board cover 28, and is electrically connected to the reader 24 and printed circuit board 12.

Lithium battery 30 is a primary (non-rechargeable) battery and can be one or more of cylindrical or coin type batteries. The cylindrical batteries can be of the AA or AAA type or any other suitable format. Lithium battery 30 is preferably chosen to have a very long shelf life and very low self discharge so that lifetimes in excess of 10 years can be achieved with the electronic lock of the present invention. Examples of suitable long-life lithium primary batteries are based on the lithium iron disulfide battery chemistry with commercially available batteries being Energizer EA91 or L91 and EA92 or L92. The capacity of L91 under constant power of 50 milliwatts (mW) at 21 degrees Celsius is 4500 mAh (milliAmperehours) and 3000 mAh under a constant current of 25 mA (milliAmpere). Other lithium primary batteries and brands that offer similar performance characteristics as those of the aforementioned lithium iron disulfide battery would be suitable alternative options. Examples of other lithium primary batteries are lithium manganese dioxide, lithium thionyl chloride, lithium sulfur dioxide, lithium carbon monofluoride, lithium copper oxide, lithium oxyphosphate, and lithium/silver vanadium oxide.

In the instance of an external fire 34, (a fire in a fire zone exterior to the door 14—for example, the hallway in most hospitality situations) heat from the fire will most effectively pass through the door 14 via heat transfer process 36, wherein heat transfer process 36 is comprised of conduction, convection and/or radiation processes. For example, a fire zone temperature of about 650° C. on the exterior side of the door 14 in some cases can result in temperatures on the interior side of the door 14 exceeding about 370° C. due to transfer of heat through the door 14. A temperature of about 370° C. can be high enough to ignite components of the electronic door lock 10. More specifically, at temperatures of about 370° C. certain electrical components of the printed circuit board 12 or other components of the electronic door lock 10 can ignite. As will be discussed subsequently, "hot surfaces" (i.e., components that can ignite flammable battery constituents at lower temperatures) such as parts of the electronic door lock 10 or door 14 can act as ignition sources for flammable battery constituents outgassed from the lithium battery 30. The printed circuit board 12 is one such problematic potential ignition source. In the presence of an ignition source such as the printed circuit board 12, the outgassed battery constituents (especially flammable gases and fumes) can violently ignite thereby propagating a flame into the door 14 and into the space exterior to the door 14 (a guest room in the example of the hospitality situation given above) from the external fire 34.

With regard to the lithium battery 30 at elevated temperatures, when the temperature experienced by the battery 30 is in the range of about 110° C. to 200° C., the battery 30 experiences an initial outgassing and some constituents of the lithium battery 30 are outgassed away from the battery 30. These constituents include a mixture of flammable gases and less flammable gasses and fumes. When the lithium battery 30 experiences temperatures of about 400° C. the lithium battery 30 experiences a second large outgassing of battery constituents including flammable gases and less flammable gases and fumes and this outgassing is accompanied by fire or deflagration. Semi-quantitatively, this second outgassing is generally of a much larger magnitude than the first, and thus, has a greater chance of violently igniting in the presence of an ignition source to propagate a flame into the door 14, electronic door lock 10, and space interior to the door 14 from the external fire 34 in the original fire zone.

To reduce the likelihood of the initiation and propagation of a flame and prevent a fire resulting from the outgassing of the lithium battery 30, the door lock 10 can be configured with thermal insulation 32 between both the printed circuit board 12 and lithium battery 30 and the door 14 interfacing portion of the electronic door lock 10. The thermal insulation 32 decreases the rate of heat transfer process 36 through the door interfacing portion of the electronic door lock 10 to the lithium battery 30 and the printed circuit board 12 during the external fire 34. The thermal insulation 32 reduces the rate of temperature rise of both the printed circuit board 12 and the lithium battery 30 within the electronic door lock 10 relative to the rate of temperature rise of a portion of the electronic door lock 10 that interfaces with the door 14 during the fire 34. The reduced rate of temperature rise of both the printed circuit board 12 and the lithium battery 30 reduces the risk of initiation and propagation of a flame and allows the door 14 to meet fire ratings such as UL10C. The reduced rate of temperature rise of both the printed circuit board 12 and the lithium battery 30 also provides more time prior to the first outgassing of the lithium battery 30 (and more time prior to when the printed circuit board 12 reaches a temperature sufficient for the printed circuit board materials to ignite) in which the fire 34 can be fought and contained without a flame occurring from ignition of the outgassed lithium battery 30 constituents. By utilizing the thermal insulation 32, the maximum temperature experienced by both the printed circuit board 12 and the lithium battery 30 during a fire 34 is substantially reduced. The temperature reduction with thermal insulation 32 relative to the door lock without the thermal insulation is of the order of 200° C. With proper selection and design of the key characteristics of thermal insulation 32, the key characteristics being its thermal conductivity (in units of W/m·K or Btu·in/h·ft$^{2}$·° F.) and its thickness, the reduction in the maximum temperature of the lithium battery 30 remains below the temperature threshold that causes the second large outgassing of battery constituents including flammable decomposition gas products arising from the charring or pyrolysis of the organic-based separator sheet. Thus, the potential for a flame occurring as a result of the second outgassing of the lithium battery 30 is reduced. Furthermore, the potential for deflagration of the other lithium battery 30 flammable materials, e.g., separator sheet in its initial state or charred/pyrolyzed state, the lithium metal foil, the electrode substrate metal foils, and the battery can metal foil, is substantially reduced or eliminated altogether.

More particularly, the thermal insulation 32 can be a high temperature ceramic sheet with a thickness of less than about 10 mm, preferably less than 7 mm, and most preferably less than 5 mm. In one embodiment, the sheet is comprised of alumina-silica fibrous material, which can withstand temperatures that exceed 1100° C., and has a thermal conductivity of <1 W/m·K (or 7 Btu·in/h·ft$^{2}$·° F.) or most preferably <0.5 W/m·K (or 3.5 Btu·in/h·ft$^{2}$·° F.). The heat flow rate is the amount of heat that flows per unit of time per unit area across the (ceramic) sheet of unit thickness if the difference in temperature between opposite faces of the sheet is 1 degree of temperature. An example of one such ceramic sheet is model number APA-3 manufactured by ZIRCAR Ceramics, Inc. of Florida, N.Y. Specifically, the APA-3 ceramic sheet is composed of 96 $Al_2O_3$, 4 $SiO_2$, by weight percent with a binder composed of alumina. Other examples of materials that are suitable for the thermal insulation 12 sheet are: alumina-silica continuous or discontinuous fibers, alumina continuous or discontinuous fibers, zirconia fibers continuous or discontinuous fibers, silica continuous or discontinuous fibers, zirconia reticulated ceramics, alumina reticulated ceramics, particulate silica aerogels, particulate alumina aerogels, particulate zirconia aerogels, or high-porosity silica aerogel sheet. Other materials that could function as thermal insulation are evacuated metal foil structures of suitable design that ensure substantially reduced heat transfer rates by conduction, convection and/or radiation. These alternative materials options for the thermal insulation 12 should have a value of effective thermal conductivity, i.e., thermal conductivity that accounts for the transfer of heat by any combination of conduction, convection and radiation and is expressed as conductivity, less than 1 W/m·K, and most preferably less than 0.5 W/m·K.

While the incorporation of thermal insulation 12 is one electronic lock feature for mitigating or containing fire from lithium batteries, the electronic lock can be configured with additional features that enhance the likelihood of fire mitigation or containment. One such additional fire mitigation or containment feature is to configure the electronic door lock 10 with a movable printed circuit board cover 28 which allows the printed circuit board 12 to be exposed to convection cooling from ambient air on the opposite side of the door 14 from the external fire 34. The printed circuit board cover 28 can be hingedly or otherwise attached to the remainder of the electronic door lock 10 such that at a predetermined temperature the printed circuit board cover 28 can fall open to expose the printed circuit board 12 to convection cooling. In alternative embodiments, the printed circuit board cover 28 can house the lithium battery 30 or printed circuit board 12 and can be configured to totally separate from and fall away from the remainder of the electronic door lock 10 once the predetermined temperature is reached or sensed. Thus, either the thermal insulation 32 or the movable printed circuit board cover 28 (or the combination of both in the electronic door lock 10) reduces the rate of temperature rise of both the printed circuit board 12 and the lithium battery 30 within the electronic door lock 10 relative to the rate of temperature rise of a portion of the electronic door lock 10 that interfaces with the door 14 during the fire 34. The reduced rate of temperature rise of both the printed circuit board 12 and the lithium battery 30 reduces the risk of propagation of a flame and allows the door 14 to meet fire ratings such as UL10C. The reduced rate of temperature rise of both the printed circuit board 12 and the lithium battery 30 also provides more time prior to the first outgassing of the lithium battery 30 (and when the printed circuit board 12 reaches a temperature sufficient to become a potential ignition source) in which the fire 34 can be fought and contained without a flame occurring from ignition of the outgassed lithium battery 30 constituents. By utilizing the thermal insulation 32 and/or the movable printed circuit board cover 28, the maximum temperature experienced by both the printed circuit board 12 and the lithium battery 30 during a fire 34 can be reduced. With this reduction in the maximum temperature, the lithium battery 30 may not achieve a temperature sufficient to cause the second large outgassing of battery constituents including flammable gases from the lithium battery 30. Thus, the potential for a flame occurring as a result of the second outgassing of the lithium battery 30 is reduced.

To reduce the likelihood of the propagation of a flame and prevent a fire resulting from the outgassing of the lithium battery 30, the door lock 10 can also be configured with components (discussed subsequently) that short circuit or nearly short circuit the lithium battery 30 during a fire 34. Lithium batteries are generally equipped with built-in safety features such as 1) a thermal switch, this being a Positive Temperature Coefficient (PTC) Thermal Switch, and 2) a Pressure Relief Vent. The PTC thermal switch is in series with the battery's internal current path. On short circuiting or near-short circuiting, the battery temperature rises by means of the combination of $I^2R$ heating and the resistance of the PTC thermal switch. Resistance of PTC thermal switch increases very quickly, limiting the current that can flow through the lithium battery 30 and preventing the battery temperature from increasing beyond a safe limit. However, the combination of this internal $I^2R$ heat generation and the reduced rates of heat loss from the lithium battery 30 as a result of the higher temperature of the ambient battery environment due to the heat transfer process 36 driven by the external fire 34 leads to a faster internal pressure rise in the lithium battery 30, thus increasing electrolyte solvent vapor pressures and causing the relief vent to open and release solvent vapors. Venting occurs at substantially earlier times (this will be referred to as event time displacement or advanced timing of events) than the time when burning (ignition) of printed circuit board 12 components begins. By time displacing or staggering the outgassing of the lithium battery 30 from the burning of a printed circuit board 12, interaction between the outgassed battery solvent and electrolyte constituents and one potential ignition source for those constituents can be reduced, thus reducing the likelihood for generation of a flame, and thereby, increasing the capability of the electronic lock's inherent or built-in features and measures to prevent fire development.

By utilizing the components and fire prevention techniques disclosed herein, lithium technology can be successfully incorporated into electronic door locks while maintaining the integrity and specifications of the fire rated doors into which the electronic door locks are installed. With the incorporation of lithium technology in electronic door locks, the service life of the battery can be extended to over ten years, rather than the two to three year battery service life achieved with alkaline batteries. This increase in battery service life allows for a reduction in operational costs associated with replacement of door lock batteries.

The configuration of the electronic lock shown in FIG. 1 is exemplary, and therefore, neither the arrangement of the lock components nor the particular components illustrated are intended to be in any way limiting. For example, the disposition of the printed circuit board and lithium battery could be altered to place those components in a mortise in the door or in an escutcheon on the exterior side of the door. Either position could be advantageous in a situation where the external fire arises on the interior side of the door. FIG. 1 simply illustrates one embodiment of an electronic lock and door that would benefit from the fire prevention techniques and components disclosed herein.

Figure 2A:
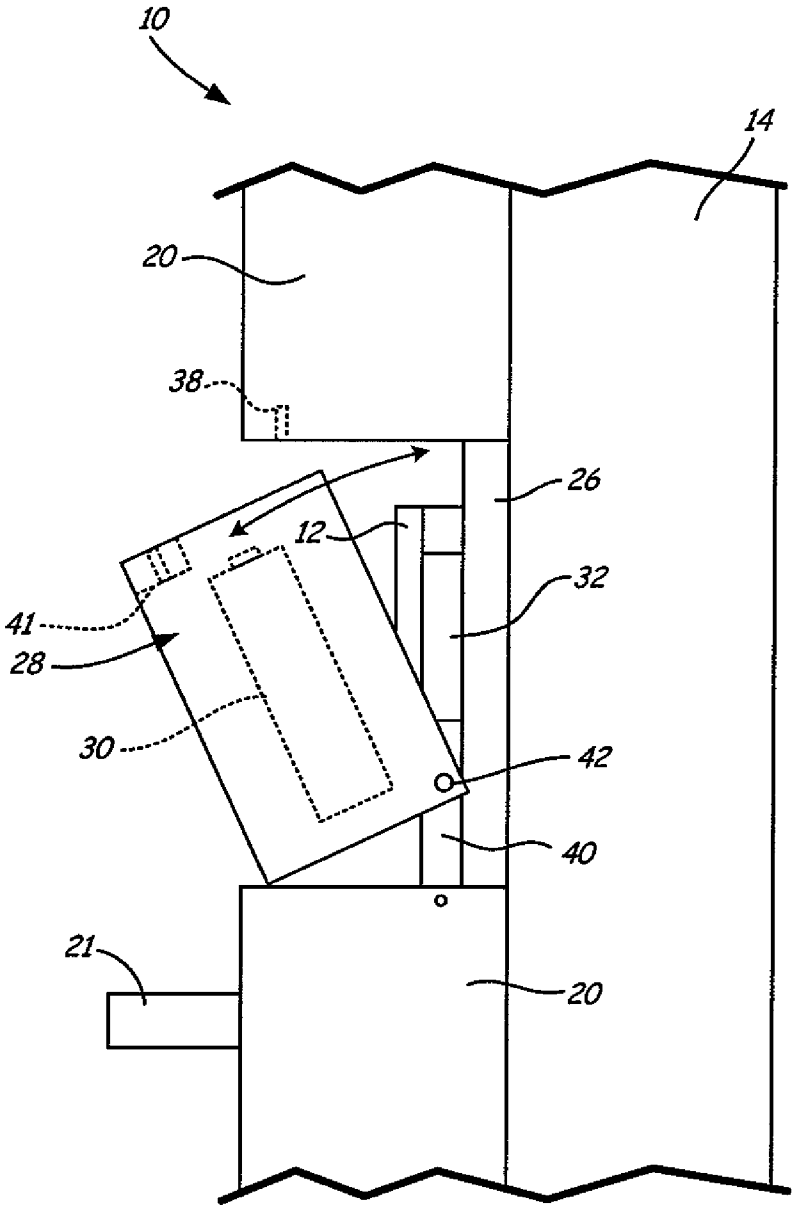
FIG. 2A is a side view of another embodiment of the electronic door lock adjacent the circuit board.

FIG. 2A is a side view of one embodiment of the printed circuit board cover 28 portion of the electronic door lock 10. In addition to the printed circuit board 12, inner lock cover 20, shaft block 21, plate 26, printed circuit board cover 28, battery 30, and thermal insulation 32, the electronic door lock 10 includes a fastener 38. The printed circuit board cover 28 includes a base 40 and a receiving member 41. The base 40 and the printed circuit board cover 28 are interconnected by a pivot pin or hinge 42.

In the embodiment of the electronic door lock 10 illustrated in FIG. 2A, the printed circuit board 12 is disposed adjacent the interior interfacing portion of the door 14 between portions of the inner lock cover 20. The shaft block 21 extends from the door 14 through a lower portion of the inner lock cover 20. The plate 26 interfaces with the door 14 and extends between and into the portions of the inner lock cover 20. In the embodiment shown, the printed circuit board cover 28 is movably disposed between the portions of the inner lock cover 20 and houses the lithium battery 30 therein. The thermal insulation 32 is disposed between the printed circuit board 12 and the plate 26. In the embodiment shown, the upper portion of the inner lock cover 20 houses the fastener 38 which extends therethrough to engage and selectively secure the printed circuit board cover 28 in a generally upright position between the upper and lower portions of the inner lock cover 20. The base 40 of the printed circuit board cover 28 is disposed on a lower portion thereof. The receiving member 41 is disposed in the interior of the printed circuit board cover 28 and is configured to receive the fastener 38. The base 40 movably secures the printed circuit board cover 28 to the plate 26. More particularly, the base 40 is connected to the movable printed circuit board cover 28 by the pivot pin or hinge 42. The pivot pin or hinge 42 connects to a lower portion of the printed circuit board cover 28 thereby allowing the printed circuit board cover 28 to movably pivot to open after the fastener 38 degrades sufficiently.

The fastener 38 can include a screw, pin, or equivalent and can be comprised of a material that degrades/melts at elevated temperatures. For example, the fastener 38 can be comprised of a thermoplastic or wax material or a low-melting-point metallic alloy, which melts or slumps or plastically deforms or loses a solid structure at a predetermined temperature above about 200° C. The degradation of the fastener 38 within the receiving member 41 thereby allows the upper portion of the printed circuit board cover 28 to swing open away from the plate 26 and door 14 and expose the battery 30 and printed circuit board 12 to natural convection cooling by the cooler ambient air. Additional amounts of convection cooling can reach the printed circuit board 12 by disposing the lithium battery 30 inside the movable printed circuit board cover 28. As the printed circuit board cover 28 opens to the ambient air, the lithium battery 30 is removed from immediately adjacent the printed circuit board 12 thereby allowing more ambient air to reach and cool the printed circuit board 12. The swing motion of the upper portion of the printed circuit board cover 28 may be driven by gravity forces or spring force (discussed in reference to FIG. 2B).

As discussed previously, the utilization of either the thermal insulation 32 or the movable printed circuit board cover 28 (or the combination of both components in the electronic door lock 10) reduces the rate of temperature rise of both the printed circuit board 12 and the lithium battery 30 within the electronic door lock 10 relative to the rate of temperature rise of the portion of the electronic door lock 10 that interfaces with the door 14 during the external fire 34. The reduced rate of temperature rise of both the printed circuit board 12 and the lithium battery 30 allows the door 14 to meet fire ratings such as UL10C. By utilizing the thermal insulation 32 and/or the movable printed circuit board cover 28, the maximum temperature experienced by both the printed circuit board 12 and the lithium battery 30 during the external fire 34 can be reduced. With this reduction in the maximum temperature the lithium battery 30 may not achieve a temperature sufficient to cause the second large outgassing of battery constituents including flammable gases from the lithium battery 30. Thus, the potential for a flame occurring as a result of the second outgassing of the lithium battery 30 is reduced.

Figure 2B:
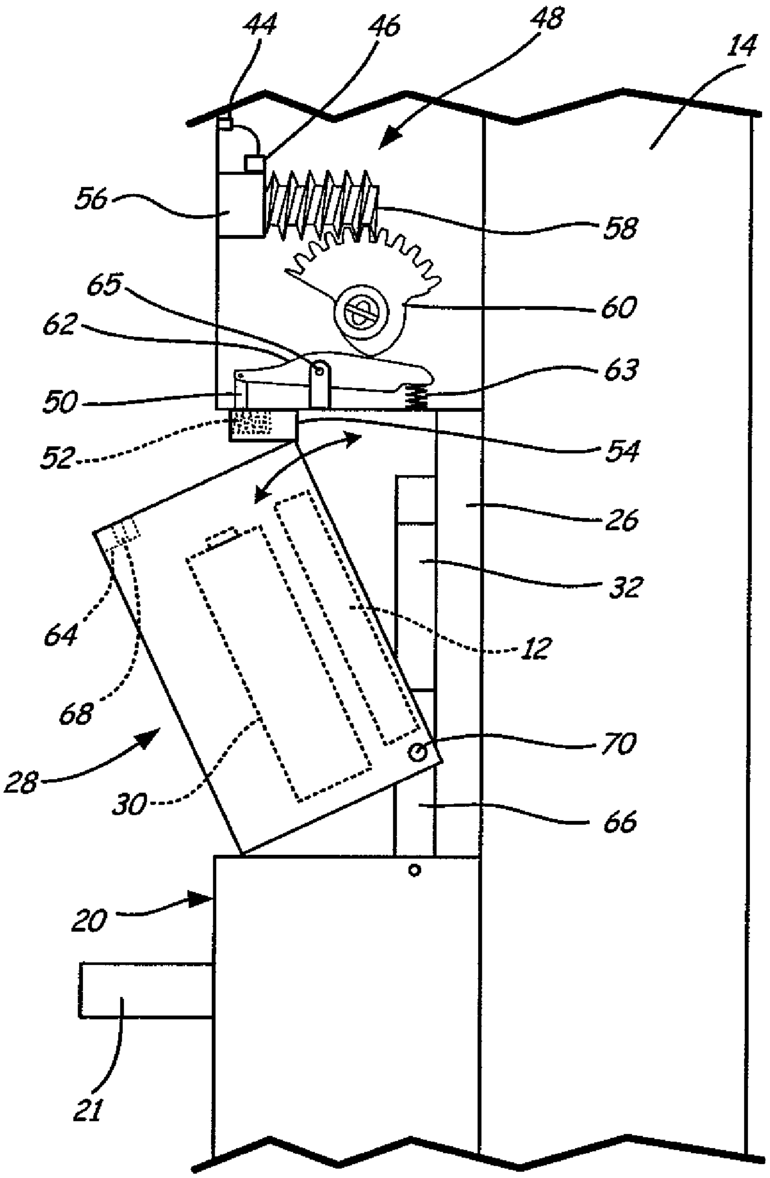
FIG. 2B is a side view of yet another embodiment of the electronic door lock adjacent the circuit board.

FIG. 2B is a side view of one embodiment of the printed circuit board cover 28 portion of the electronic door lock 10 with a top side portion of the inner lock cover 20 removed. In addition to the printed circuit board 12, inner lock cover 20, shaft block 21, plate 26, printed circuit board cover 28, battery 30, and thermal insulation 32, the electronic door lock 10 includes a temperature sensor 44, a controller 46, a drive unit 48, a fastener 50, a first spring 52, and a spring housing 54. The drive unit 48 includes a motor 56, a worm gear 58, a cam 60, a lever arm 62, and a second spring 63. The printed circuit board cover 28 includes a spring block 64, and a base 66. The block includes an aperture 68. The base 66 and the printed circuit board cover 28 are interconnected by a pivot pin or hinge 70.

In the embodiment of the electronic door lock 10 illustrated in FIG. 2B, the printed circuit board 12 is disposed within the printed circuit board cover 28 adjacent the interior interfacing portion of the door 14. The shaft block 21 movably extends from the door 14 through a lower portion of the inner lock cover 20. The plate 26 interfaces with the door 14 and extends between and into the portions of the inner lock cover 20. In the embodiment shown, the printed circuit board cover 28 is movably disposed between the portions of the inner lock cover 20 and houses the lithium battery 30 and printed circuit board 12 therein. The thermal insulation 32 is disposed adjacent the printed circuit board 12 and the plate 26. The temperature sensor 44 is housed within or can be disposed adjacent the inner lock cover 20. The upper side portion of the inner lock cover 20 is removed to allow the viewer to better observe the controller 46, drive unit 48, and fastener 50 which are housed therein. The controller 46 receives and processes signals from the temperature sensor 44, and in response to a predetermined sensed temperature, selectively actuates the drive unit 48 which moves the fastener 50 out of engagement with the printed circuit board cover 28. With the fastener 50 removed from the spring block 64, the first spring 52 which is housed within the spring housing 54 exerts a bias on the spring block 64 (which had been received within the spring housing 54) causing the printed circuit board cover 28 to swing open and expose the printed circuit board 12 to natural convection cooling by the ambient air.

More particularly, the controller 46 receives and processes signals from the temperature sensor 44 and in response to a predetermined sensed temperature selectively actuates the motor 56 housed in the inner lock cover 20. The motor 56 turns the worm gear 58 which intermeshes with the top portion of the cam 60. The intermeshing of the worm gear 58 and cam 60 rotates the cam 60 into depressing engagement with a top portion of the lever arm 62. The engagement of the cam 60 with the top portion of the lever arm 62 overcomes the bias of the second spring 63 on a bottom portion of the lever arm 62 to rotate the lever arm 62 about a pivot point 65 of the lever arm 62. The rotation of the lever arm 62 raises the portion of the lever arm 62 disposed to the other side of the pivot point 65 from the cam 60 upward away from the inner lock cover 20. This in turn raises the notched fastener 50 (which is engaged by the lever arm 62) upward out of the spring housing 54 and out of engagement with the spring block 64.

The fastener 50 movably extends through the inner lock cover 20 and is received in the aperture 68 in the spring block 64. Thus, the fastener 50 can be selectively moved by the lever arm 62 to withdraw the fastener 50 from the aperture 68 thereby allowing the first spring 52 to move the printed circuit board cover 28 relative to the base 66. The printed circuit board cover 28, biased by the first spring 52, swings open on the pivot pin or hinge 70 to expose the printed circuit board 12 to natural convection cooling by the ambient air.

Prior to engagement of the lever arm 62 by the cam 60, the portion of the lever arm 62 disposed to the opposite side of the pivot point 65 from the cam 60 is biased downward toward the inner lock cover 20 by the second spring 63. This downward bias extends the fastener 50 through the inner lock cover 20 and into the aperture 68 of the spring block 64. When received in the aperture 68, the fastener 50 retains the spring block 64 at least partially within a cavity in the spring housing 54 against the bias of the compressed first spring 52. Thus, when received in the aperture 68 the fastener 50 secures the printed circuit board cover 28 in a generally upright position between the upper and lower portions of the inner lock cover 20.

The embodiments shown in FIGS. 2A and 2B are exemplary, and therefore, one of skill in the art could substitute or modify the components to achieve the same overall function, namely to allow the printed circuit board cover 28 to be moved from a closed position to an open position with the upper portion of the printed circuit board cover 28 extending away from and portion of the electronic lock 10 that interfaces the door 14 thereby allowing for convection cooling of the printed circuit board 12 and lithium battery 30 or alternatively to allow the circuit board 12 and the lithium battery 30 or either one of the lithium battery 30 or circuit board 12 to separate from the electronic door lock 10 and fall away from the lock 10. The printed circuit board cover 28 housing the lithium battery 30 can be physically disposed or separated away from the printed circuit board 12 (which can be housed within the inner lock cover 20 to reduce the likelihood of fire. For example, the drive unit illustrated in FIG. 2B can be modified or supplanted with any number of motion transmission devices including plungers, helical gears, bevel gears, or pulleys. Similarly, various actuators may be substituted in lieu of a motor including various mechanical, hydraulic, pneumatic, piezoelectric, or electro-mechanical devices.

Figure 3A:
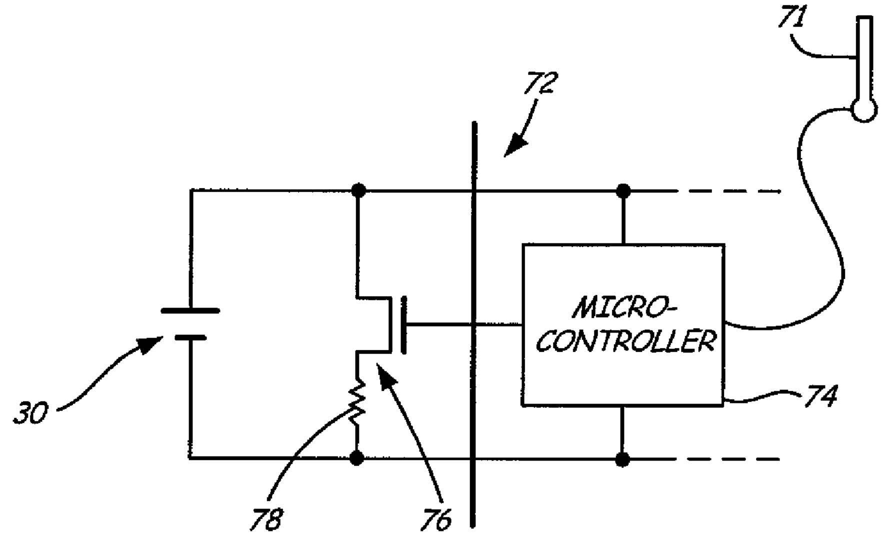
FIG. 3A is a schematic view of one embodiment of an electrical circuit with components operable to cause a connection between the two terminals of the lithium battery 30 and allow a large amount of current to flow therebetween.

FIG. 3A is a schematic view of one embodiment of a temperature sensor 71 and electronic circuit 72 with components operable to cause a connection between the two terminals of the lithium battery 30 and allow a large amount of current to flow therebetween. The high amount of current nearly short circuits the lithium battery 30. In addition to the lithium battery 30, the electronic circuit 72 interconnects a microcontroller 74, a transistor 76, and a resistor 78. In the embodiment shown in FIG. 3A, the transistor 76 is a Metal Oxide Semiconductor Field-Effect Transistor ("MOSFET"), and in particular a power MOSFET. In alternative embodiments, the transistor 76 may be a bipolar transistor.

The temperature sensor 71 can be housed within or adjacent the inner lock cover 20 (FIG. 1) and is electrically connected to the electronic circuit 72. More particularly, the temperature sensor 71 connects to and signals the microcontroller 74 which receives and processes the signals from the temperature sensor 71. In response to a predetermined sensed temperature, (for example 100° C. in one embodiment) the microcontroller 74 selectively switches on the power MOSFET 76 which creates a connection between the two terminals of the lithium battery 30. More particularly, the microcontroller 74 applies voltage to a gate of the power MOSFET 76 thereby causing an electrical connection between a source and a drain of the power MOSFET 76. The connection of the source and the drain of the power MOSFET 76 closes the electronic circuit 72 so as to nearly short circuit the positive and negative terminals of the lithium battery 30. The resistor 78 can be disposed in the electronic circuit 72 between the power MOSFET 76 and one terminal of the lithium battery 30 to limit the amount of current to a level that will not result in damage to the power MOSFET 76.

Figure 3B:
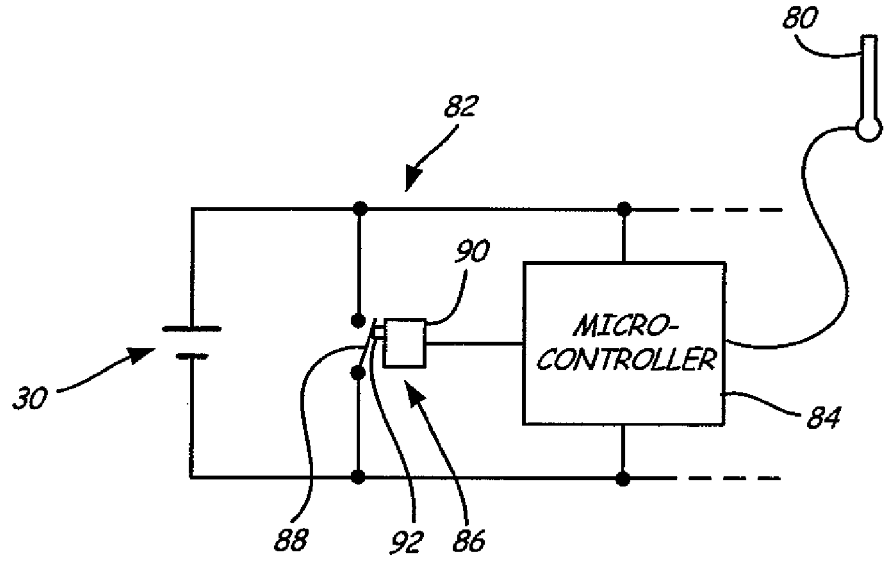
FIG. 3B is a schematic view of another embodiment of an electrical circuit with components operable to cause a connection between the two terminals of the lithium battery 30 and allow a large amount of current to flow therebetween.

In regard to the electronic circuit 72 with the components shown in FIG. 3A, the term "nearly short circuit" is used to contrast the circuit illustrated with the "classical" short circuit (mechanical switch and electrical wire with extremely low resistance) illustrated in FIG. 3B. The electronic circuit 72 and components shown in FIG. 3A, in particular the power MOSFET 76 and resistor 78 have an inherent resistance which is larger than the resistance of the "classical" short circuit illustrated in FIG. 3B. However, the electronic circuit 72 and components shown in FIG. 3A have low enough resistance to allow a large amount of current to flow between the terminals of the lithium battery 30.

The near short circuiting of the lithium battery 30 increases the temperature of the lithium battery 30 at a faster rate than would otherwise occur without the creation of the short circuit. This quicker rate of temperature rise of the lithium battery 30 allows the time period when the first outgassing of the lithium battery 30 occurs to be staggered relative to the time period when burning (ignition) of a printed circuit board 12 begins in the electronic door lock 10 during an external fire 34 (FIG. 1). By staggering the outgassing of the lithium battery 30 from the burning of a printed circuit board 12, interaction between the outgassed battery constituents and one potential ignition source for those constituents can be reduced, thus reducing the likelihood of generation of a flame (FIG. 1).

FIG. 3B is a schematic view of another embodiment of a temperature sensor 80 and an electronic circuit 82 with components operable to cause a connection between the two terminals of the lithium battery 30 and allow a large amount of current to flow therebetween. The high amount of current short circuits the lithium battery 30. In addition to the lithium battery 30, the electronic circuit 82 interconnects a microcontroller 84, a drive unit 86, and a switch 88. The drive unit 86 includes a motor 90 and a plunger 92.

The temperature sensor 80 can be housed within or adjacent the inner lock cover 20 (FIG. 1) and is electrically connected to the electronic circuit 82. More particularly, the temperature sensor 80 is connected to and signals the microcontroller 84 which receives and processes the signals from the temperature sensor 80. In response to a predetermined sensed temperature the microcontroller 84 actuates the drive unit 86. The drive unit 86 mechanically closes the switch 88 to create a closed loop contact between a positive and a negative terminal of the lithium battery 30. In the embodiment shown, the microcontroller 84 actuates the motor 90 which moves the plunger 92 into engagement with the switch 88. In response to engagement by the plunger 92, the switch 88 closes to create a closed loop between a positive and a negative terminal of the lithium battery 30. The closed loop short circuits the lithium battery 30. The drive unit illustrated in FIG. 3B can be modified or supplanted with any number of motion transmission devices including a worm gear, helical gears, bevel gears, or pulleys. Similarly, various actuators may be substituted in lieu of a motor including various hydraulic, pneumatic, piezoelectric, or electro-mechanical devices.

Although the present invention has been described with reference to preferred embodiments, workers skilled in the art will recognize that changes may be made in form and detail without departing from the spirit and scope of the invention.

The invention claimed is:

1. An electronic door lock adapted to prevent a fire as a result of outgassing of a lithium battery, the lock comprising:
- the lithium battery housed within the electronic door lock;
- a temperature sensor generating a temperature signal, the temperature sensor positioned external to the lithium battery;
- a controller receiving the temperature signal from the temperature sensor;
- an electronic circuit housed in the electronic door lock, the electronic circuit including a switch connected across the terminals of the lithium battery;
- wherein the controller is programmed to close the switch in response to a temperature rise indicated by the temperature signal to initiate outgassing of the lithium battery prior to ignition of a component of the lock.

2. The electronic door lock of claim 1, wherein the switch comprises a transistor having a source terminal connected to a first terminal of the lithium battery, a drain terminal connected to a second terminal of the lithium battery and a gate terminal connected to the controller.

3. The electronic door lock of claim 1, further comprising a drive unit coupled to the switch, the controller programmed to command the drive unit to close the switch in response to the temperature signal.

4. The electronic door lock of claim 1, further comprising a printed circuit board and thermal insulation, the thermal insulation placed between at least one of the printed circuit board or the lithium battery and the door interfacing side of the electronic door lock.

5. The electronic door lock of claim 1, further comprising a printed circuit board and an external barrier extending over the printed circuit board, the external barrier positioned over the printed circuit board, the external barrier adapted to be selectively movable away from over the printed circuit board in response to the temperature rise to expose the printed circuit board to convection from ambient air.

6. The electronic door lock of claim 1, further comprising a resistor in series with the switch.

* * * * *